(12) United States Patent
Morgan et al.

(10) Patent No.: US 10,793,233 B1
(45) Date of Patent: Oct. 6, 2020

(54) APPARATUS AND METHOD FOR ADAPTING STAND UP PADDLEBOARDS TO STABLE RECREATIONAL PLATFORMS

(71) Applicants: Dean Morgan, Horseshoe Bay, TX (US); Jeanna Jett, Spicewood, TX (US)

(72) Inventors: Dean Morgan, Horseshoe Bay, TX (US); Jeanna Jett, Spicewood, TX (US)

( * ) Notice: Subject to any disclaimer, the term of this patent is extended or adjusted under 35 U.S.C. 154(b) by 0 days.

(21) Appl. No.: 15/798,783

(22) Filed: Oct. 31, 2017

Related U.S. Application Data

(60) Provisional application No. 62/414,859, filed on Oct. 31, 2016.

(51) Int. Cl.
| | | |
|---|---|---|
| *B63B 43/14* | (2006.01) | |
| *B63B 35/79* | (2006.01) | |
| *B63B 32/60* | (2020.01) | |
| *B63B 25/00* | (2006.01) | |
| *B63C 11/18* | (2006.01) | |
| *A01K 75/00* | (2006.01) | |
| *B63H 16/073* | (2006.01) | |
| *B63B 17/02* | (2006.01) | |
| *A01K 97/10* | (2006.01) | |
| *B63C 11/26* | (2006.01) | |
| *B63B 32/55* | (2020.01) | |
| *B63B 32/77* | (2020.01) | |

(52) U.S. Cl.
CPC .............. *B63B 32/60* (2020.02); *A01K 75/00* (2013.01); *A01K 97/10* (2013.01); *B63B 17/02* (2013.01); *B63B 25/002* (2013.01); *B63B 25/004* (2013.01); *B63C 11/18* (2013.01); *B63C 11/26* (2013.01); *B63H 16/073* (2013.01); *B63B 32/55* (2020.02); *B63B 32/77* (2020.02)

(58) Field of Classification Search
CPC .............. B63B 43/14; B63B 2043/145; B63B 2001/186; B63B 2735/00; B63B 35/34; B63B 35/36; B63B 35/38
See application file for complete search history.

(56) References Cited

U.S. PATENT DOCUMENTS

| 4,545,772 A | * | 10/1985 | Stockhausen | ....... B63B 35/7933 441/74 |
| 4,807,551 A | * | 2/1989 | Ace | ......... B63B 1/121 114/123 |

(Continued)

*Primary Examiner* — Andrew Polay
(74) *Attorney, Agent, or Firm* — Rick B. Yeager

(57) ABSTRACT

A rigid or inflatable stand up paddleboard (SUP) conversion kit to provide a stable recreational platform for fishing, diving, hunting, nature photography, birdwatching or other activity. A detachable frame positions a pair of pontoons rearward relative to the SUP to avoid interference with rowing. A rolling storage case stores activity accessories such as diving or fishing equipment. After securing the storage case to the SUP, the case serves as a storage seat. A rear canopy frame may be assembled onto the SUP in order to support a rear canopy to conceal the user; and a front canopy frame may assembled onto the SUP in order to provide additional concealment that may be used for a hunting dog. The various conversion kits are compact and self-contained, and can fit easily in the trunk of a car.

19 Claims, 16 Drawing Sheets

(56) References Cited

U.S. PATENT DOCUMENTS

| | | | | |
|---|---|---|---|---|
| 4,898,113 | A * | 2/1990 | Tapley | B63B 35/7926 |
| | | | | 114/283 |
| 7,124,702 | B1 * | 10/2006 | Cameron | B63B 35/71 |
| | | | | 114/352 |
| 8,932,095 | B1 * | 1/2015 | Hudson | B63B 35/7933 |
| | | | | 114/123 |
| 9,126,655 | B2 * | 9/2015 | Swan | B63B 7/087 |
| 9,643,696 | B1 * | 5/2017 | Lockhart | B63B 35/85 |
| 2006/0102063 | A1 * | 5/2006 | Boelryk | B63B 35/71 |
| | | | | 114/347 |
| 2014/0230709 | A1 * | 8/2014 | Reynolds, Jr. | B63B 43/04 |
| | | | | 114/123 |
| 2016/0368574 | A1 * | 12/2016 | Bell | B63B 25/002 |

* cited by examiner

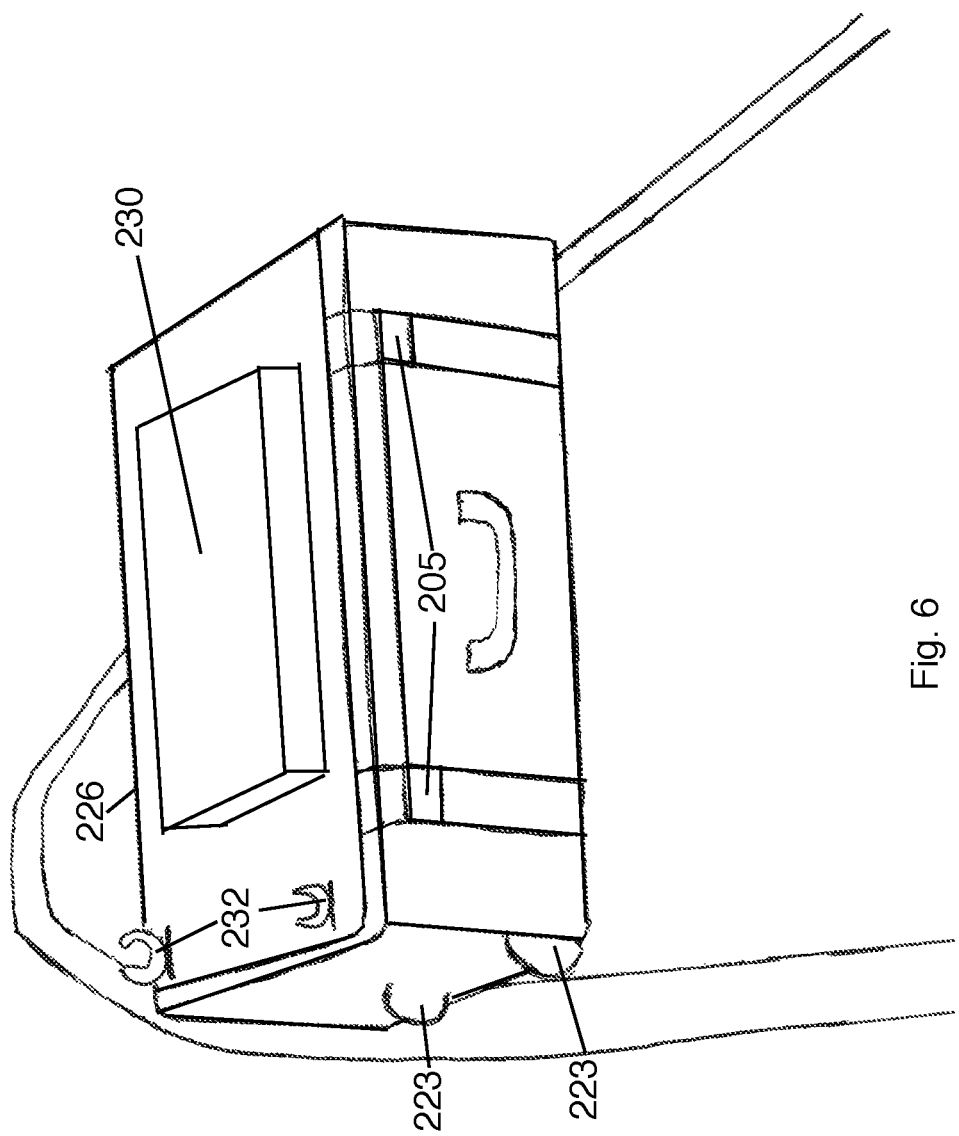

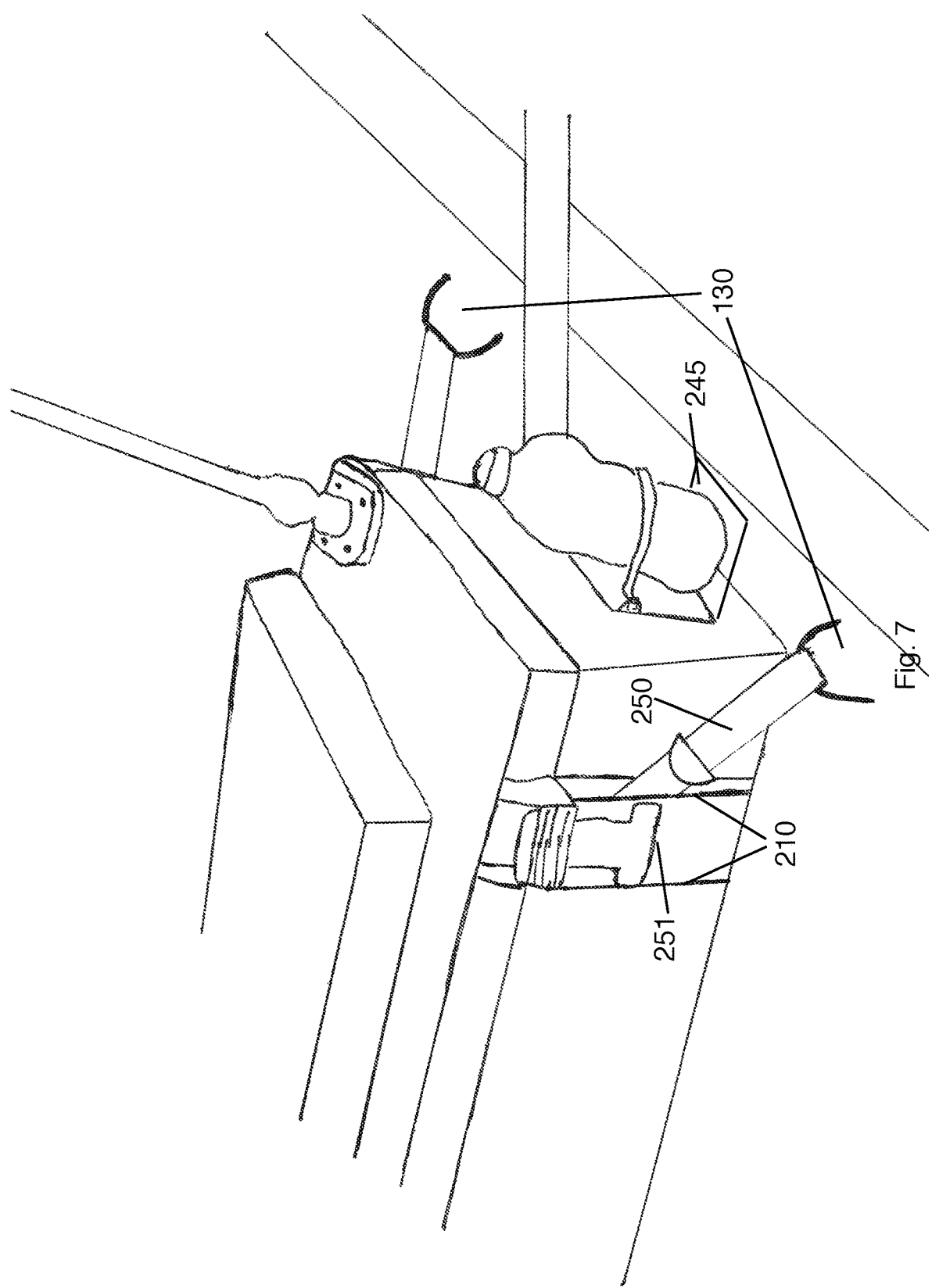

APPARATUS AND METHOD FOR ADAPTING STAND UP PADDLEBOARDS TO STABLE RECREATIONAL PLATFORMS

This US non-Provisional Patent Application is related to U.S. Provisional Application No. 62/414,859 filed by applicants on Oct. 31, 2016, and claims the priority of that filing date.

BACKGROUND

Field of Invention

The current invention relates to an apparatus and method for providing stabilizing pontoons and a seat for a stand up paddleboard (SUP) in order to provide a functional recreational platform.

SUMMARY OF INVENTION

In one embodiment, a conversion kit is provided to quickly adapt a rigid or inflatable stand up paddleboard (SUP) to a diving platform. In one example, the kit includes a rolling storage case that can be attached to a SUP; a pair of stabilizing pontoons and frame. Scuba accessories may be stored and transported in the rolling storage case.

In one embodiment, a conversion kit is provided to adapt a SUP for a first diver by providing accessories that are designed specifically for diving. The ScubaSUP is ideal for getting to more remote dive sites that may be too far to swim from shore, but where a boat dive is not necessary. After securing the rolling storage container to the SUP, the container serves as a storage seat. The user may paddle out to a dive site, pull gear out of the storage seat and tank cradle, slip it on and slide into the water.

In another embodiment, a conversion kit includes a kayak seat and a tank cradle for a second Scuba tank which are secured to the SUP so that a second person can sit or stand near the kayak seat while a first person sits on the rolling storage container. This example allows two people to dive from one SUP. One diver can paddle from the kayak seat while the other diver paddles from a standing position or seated on the storage seat.

In another embodiment, a conversion kit is provided to adapt a SUP for fishing. In one example the conversion kit includes a storage container that serves as a seat when attached to the SUP; a pair of stabilizing pontoons, and a rod holder. In one example, the conversion kit includes a pair of stakeout poles, and stakeout pole holders are provided. In other examples, other items may be added, such as a fish finder, bait cutting board, or trolling motor.

In another embodiment, a conversion kit is provided to adapted to provide one or more retractable canopies in order to adapt the SUP for hunting, nature photography, or birdwatching. In one example, a rear canopy frame is assembled onto the SUP in order to support a rear canopy to conceal the user; and a front canopy frame is assembled onto the SUP in order to provide additional concealment that may be used for a hunting dog. The various conversion kits are compact and self-contained, and can fit easily in the trunk of a car.

BRIEF DESCRIPTION OF THE DRAWINGS

FIG. 6 is a front perspective view of a closed rolling storage case positioned on the rear portion of a SUP.

FIG. 7 is a front perspective detailed view of a rolling storage case secured to a SUP.

DESCRIPTION OF EMBODIMENT

Figure 1:
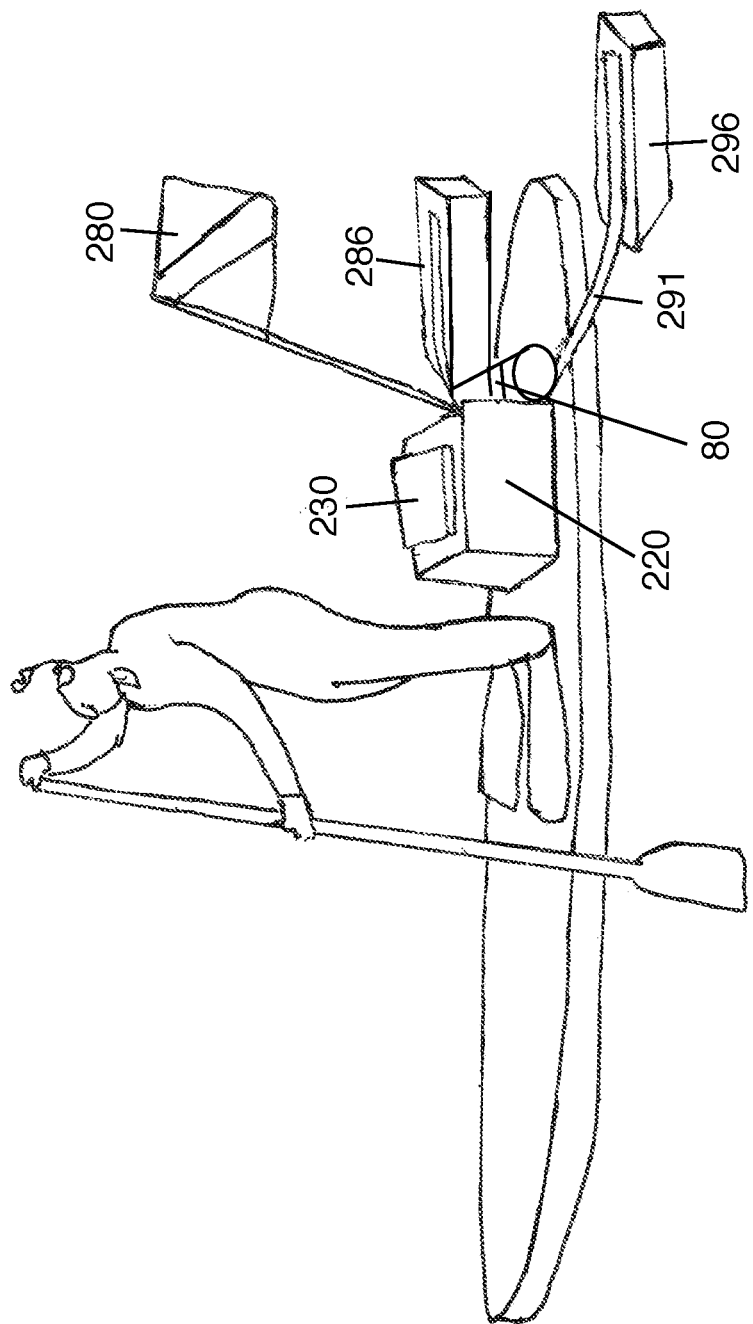
FIG. 1 is a side perspective view of a diver paddling a SUP with a rolling storage case installed on the SUP.

Stabilization and Utility Kit for Adapting a SUP for Diving

The following element numbers referenced in the drawings are provided for convenience.

Scuba tank 80, 81
SUP 100
top surface 101
front end 102
rear end 104
right side 106
left side 108
tie-down elements 110
stand up paddleboard backpack 120
hold down rings 130
diving conversion kit 201
rolling storage case 220
closure elements 205
hinge 206
bottom 222
top 224
hinge 226
paddle clips 232, 234
flag holder 240
drink holder 245
tie down straps 250, 252
strap pins 251, 253
wheels 223
reinforcement ribs 210
axles 212 side handle 225
front handle 226
PFD seat cushion 230
dive flag 280
paddle assembly 260
pole segments 262, 264
paddle 266
tank straps 270, 272
right side pontoon assembly 280
frame 281
proximal portion 282
distal portion 284
lateral frame element 285
diagonal frame segment 287
pontoon frame segment 289
right side pontoon 286
adjustment slots 288a, 288b left
side pontoon assembly 290
frame 291
proximal portion 292
distal portion 294
lateral frame element 295
diagonal frame segment 297
pontoon frame segment 299
left side pontoon 296
adjustment slots 298a, 298b
kayak seat 300
scuba tank cradle 400
base 410
concave frame 412
tank hold down straps 420
fishing conversion kit 501
rod holder 530
stakeout poles 510, 520
hunting conversion kit 601
front canopy 610
retractable rear front canopy 620
front canopy frame 640
base frame assembly 642
left side frame 642a
right side frame 642b
joint 641
retaining ring 643a, 643b, 643c
slot 639
clip 649
rear vertical assembly 645
elbow sections 646a, 646b
vertical sections 647a, 647b
middle support 644
retractable rear canopy frame 650
base assembly 652,
left side 652a
right side 652b
joint 653
vertical assembly 654
vertical supports 655a,655b
pivotal vertical support elements 670
forward angled frame assembly 656
rearward angled frame assembly 658
straps 645a, 645b, 645c, 645d
rings 643e, 643f In one embodiment, a diving conversion kit 201 comprises a rolling storage case 220 that may be attached to a SUP, a personal flotation device (PFD) 230 that may serve as a seat cushion, and a paddle assembly that may be stored in the storage case. The storage case may have wheels 223, a side handle 225 for pulling the case on its wheels, a front handle 226 for carrying the case like a suitcase; and may have additional features such as a dive flag holder 240, a drink holder 245, and tank straps 270 and 272.

FIG. 1 is a side perspective view of a diver paddling a SUP with a rolling storage case 220 installed on the top surface 101 of a SUP 100. In this example, a PFD seat cushion 230 is provided on top 224 of the case, which is strapped to the SUP A first scuba tank 80 is strapped to the rear of the case, and a dive flag 280 is held in a flag holder (not shown). A left side pontoon 296 and a right side pontoon 286 are supported by pontoon frames 291 and 281 which position the pontoons outward from the SUP and sufficiently rearward not to interfere with paddling.

Figure 2:
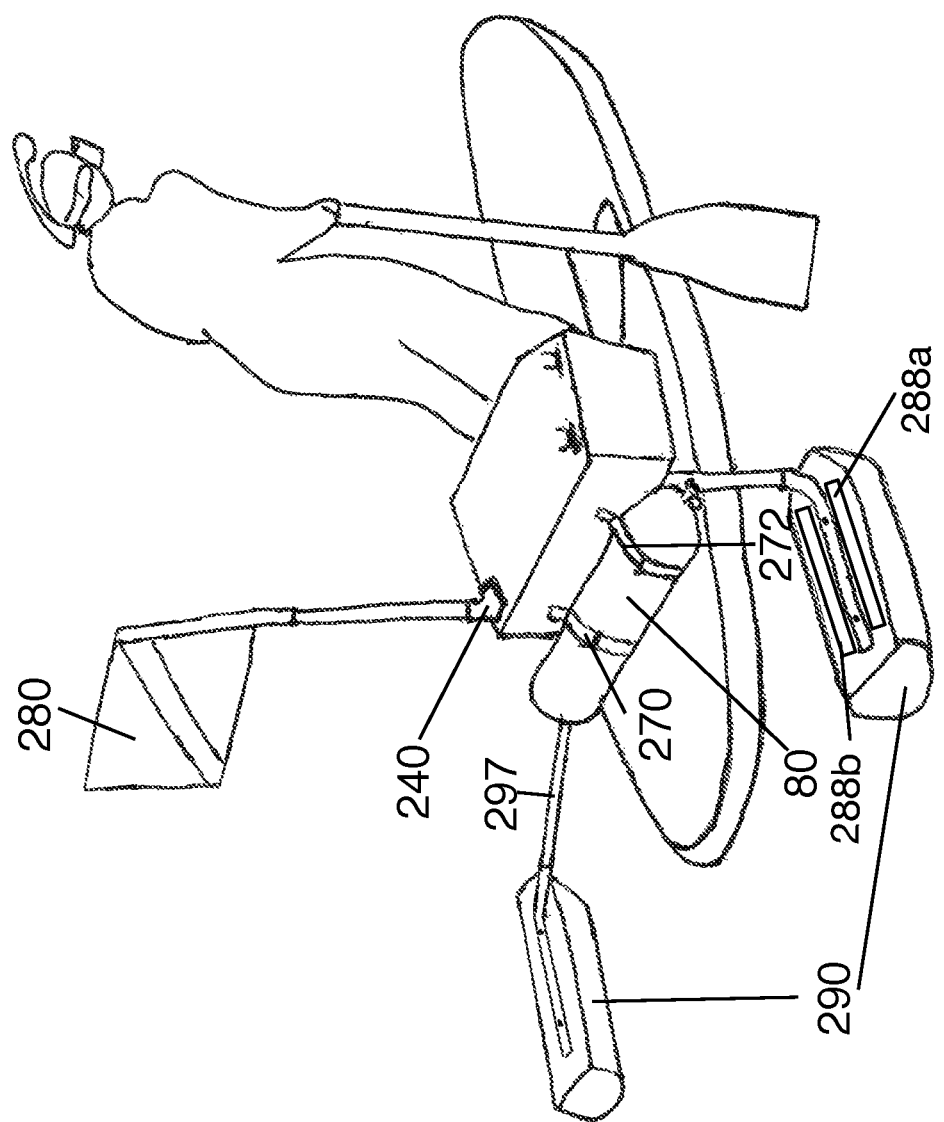
FIG. 2 is a rear perspective view of a diver paddling the SUP with the rolling storage case of FIG. 1.

FIG. 2 is a rear perspective view of a diver paddling a SUP with a rolling storage case installed on the SUP The first scuba tank 80 is shown secured to the rear of the case with straps 270 and 272. A dive flag 280 is held in a flag holder 240. The SUP is stabilized by a right side pontoon assembly 280 and a left side pontoon assembly 290. A left side pontoon 296 and a right side pontoon 286 are supported by assembled frame segments comprising a lateral frame element 285 (not shown) secured to the case, diagonal frame segments 297 and 287, and pontoon frame segments 299 and 289 comprising a straight section and a bent section. The assembled frame sections have proximal portions 292 and 282 near the storage case, and distal portions 294 and 284 attached to the pontoons.

Figure 3:
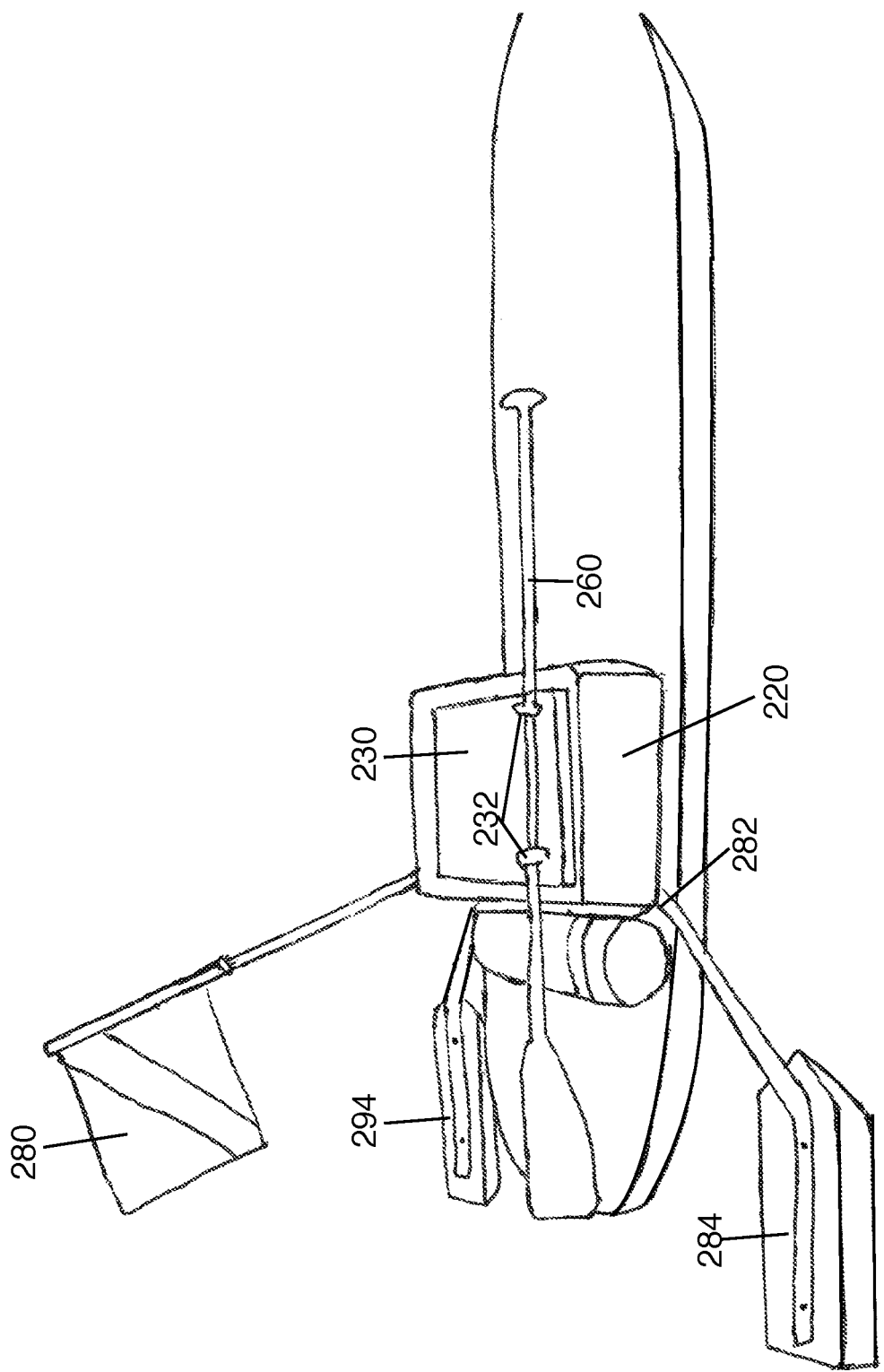
FIG. 3 is a right side perspective view of a rolling storage case secured to the rear portion of a SUP.

FIG. 3 right side perspective view of a rolling storage case 220 secured to the of the rear portion of a SUP A first scuba tank 80 is secured to the case, and the paddle is held by clips 232 and 234 on the top 224 of the case. The seat provides a spot to rest so that the user need not always stand, and is useful for resting at the surface after diving, or for longer fishing or hunting expeditions. The seat is also good for the balance-challenged or people with certain disabilities or injuries.

Figure 4:
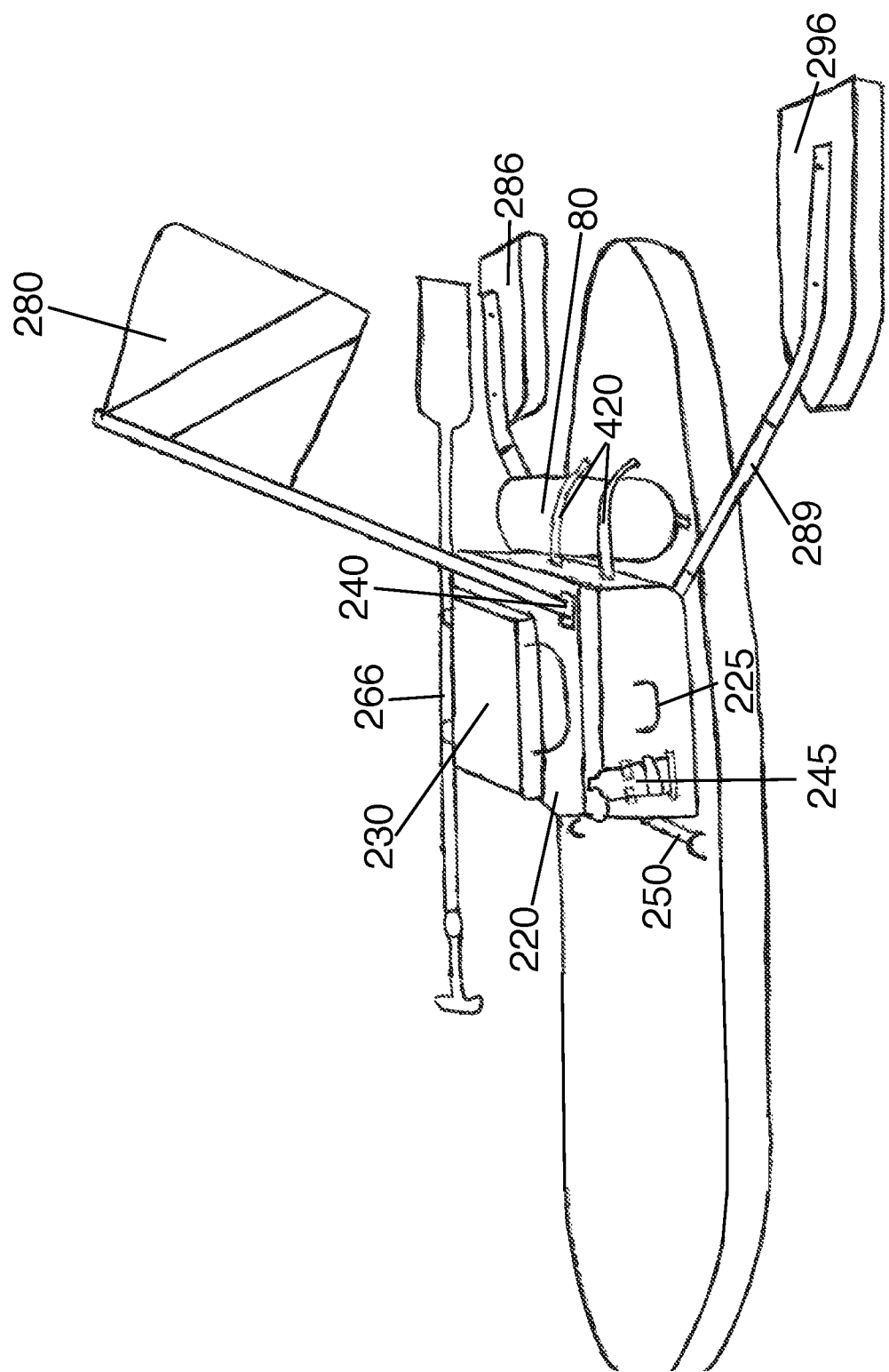
FIG. 4 is a left side perspective view of a rolling storage case secured to the rear portion of a SUP.

FIG. 4 is a left side perspective view of a rolling storage case 220 secured to the of the rear portion of a SUP.

Figure 5:
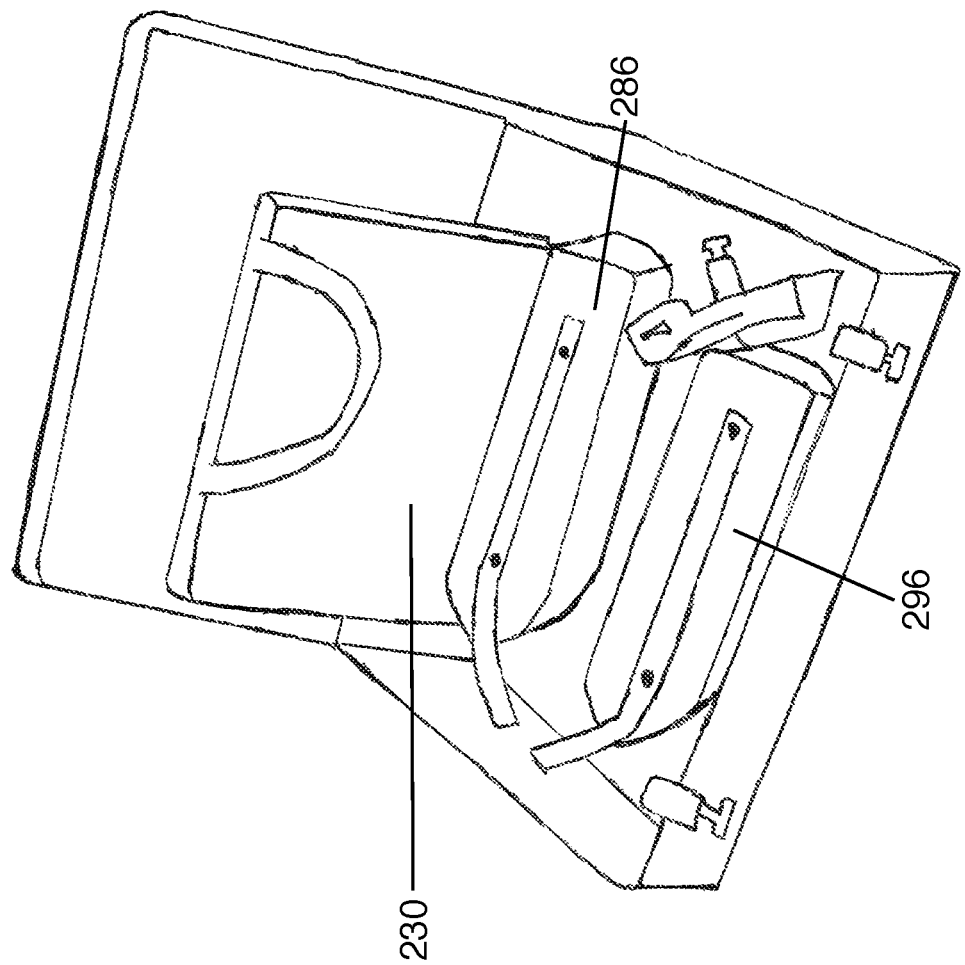
FIG. 5 is top perspective view of an open storage case showing pontoons, pontoon frame elements and a PFD.

FIG. 5 is top perspective view of an open storage case 220 showing pontoons 286 and 296, and pontoon frame elements and a PFD.

FIG. 6 is a front perspective view of a closed rolling storage case 220 positioned on the rear portion of a SUP. In this case, a pair of wheels 223 are provided on the right side of the case. In this example, each wheel is mounted on an axle 212 positioned between a pair of reinforcement ribs 210. A first front handle 226 is provided for carrying the case, and a side handle 225 (not shown) is provided on the left side of the case to permit the case to be rolled. A pair of paddle hold down clips 232, 234 are provided on the top of the case to secure the paddle when not in use. The contents of the container may be accessed by opening the case closure elements 205. APFD cushion is typically placed on the top of the case to permit more comfortable seating. The top of the case is attached with hinges 226 (not shown). In some examples the PFD may be removable attached to the case with hook and loop fasteners.

FIG. 7 is a front perspective detailed view of a rolling storage case secured to a SUP. In this example of pair of tie down straps 250, 252 attached the rear of the storage case to hold down rings 130 provided on the SUP. In this example, the left side hold down and right side hold down are strengthened by pairs of spaced apart ribs 210 on the front of the case, and pins 251, 253 are provided between the ribs to provide a strap tie down feature on the case.

In other examples, the hold down may be provided by metal attachment clamps coated in non-slip, scratch resistant plastic or rubber, so that the clamps conform to the profile of the rails of the stand up paddleboard. In other examples, SUP attachment clamps may be constructed of a plastic or reinforced plastic. The clamps may be strapped to the frame assembly by wrapping straps around the frame; tightening the straps; and buckling the straps with strap buckles. A strap slot may be provided in each SUP attachment clamp. The clamp attachment provides a universal attachment to all board-types and to varying thicknesses of the rails. It is not a permanent installation and, therefore, can be moved from board to board. It is simple to set up and does not require a curing period after installation. It does not create drag in the water.

Pontoon Location

In this embodiment, a pair of pontoons provide stability for the SUP The pontoons are angled back away from the front of the board, thereby allowing the paddler to sit down on the seat or stand up to paddle, without interfering with the natural paddle stroke. In the examples above, the pontoons are positioned outward of the rear quarter portion of the SUP, and this placement provides stability without interfering with paddles, and allows room for the user to dismount and mount the SUP, such as in the diving example.

In this example, the position of the pontoons is adjustable either by adjusting frame length, or by the points of attachment of the frame to the pontoon. In one example, there are different hole positions drilled into the frame tubing under the storage seat area where the frame tubing which is connected to the pontoon can slide inward or outward with respect to the seat. The tubing under the storage seat comprises three different positions that a snap button on the pontoon frame tubing can click into.

The pontoons may be inflatable or rigid. The pontoons can provide stability for casting or tying flies or lures for fishing, breaking through surf or climbing on and off the board with scuba gear, or recoil of a gun for hunting. The pontoons also provide stability for balanced-challenged or disabled persons. The converted SUP is stable enough to permit a wheelchair to be attached.

Stabilization pontoons also help keep the SUP steady as hunting dogs jump off the board to collect the ducks (or other game) and climb back on the SUP.

Figure 12:
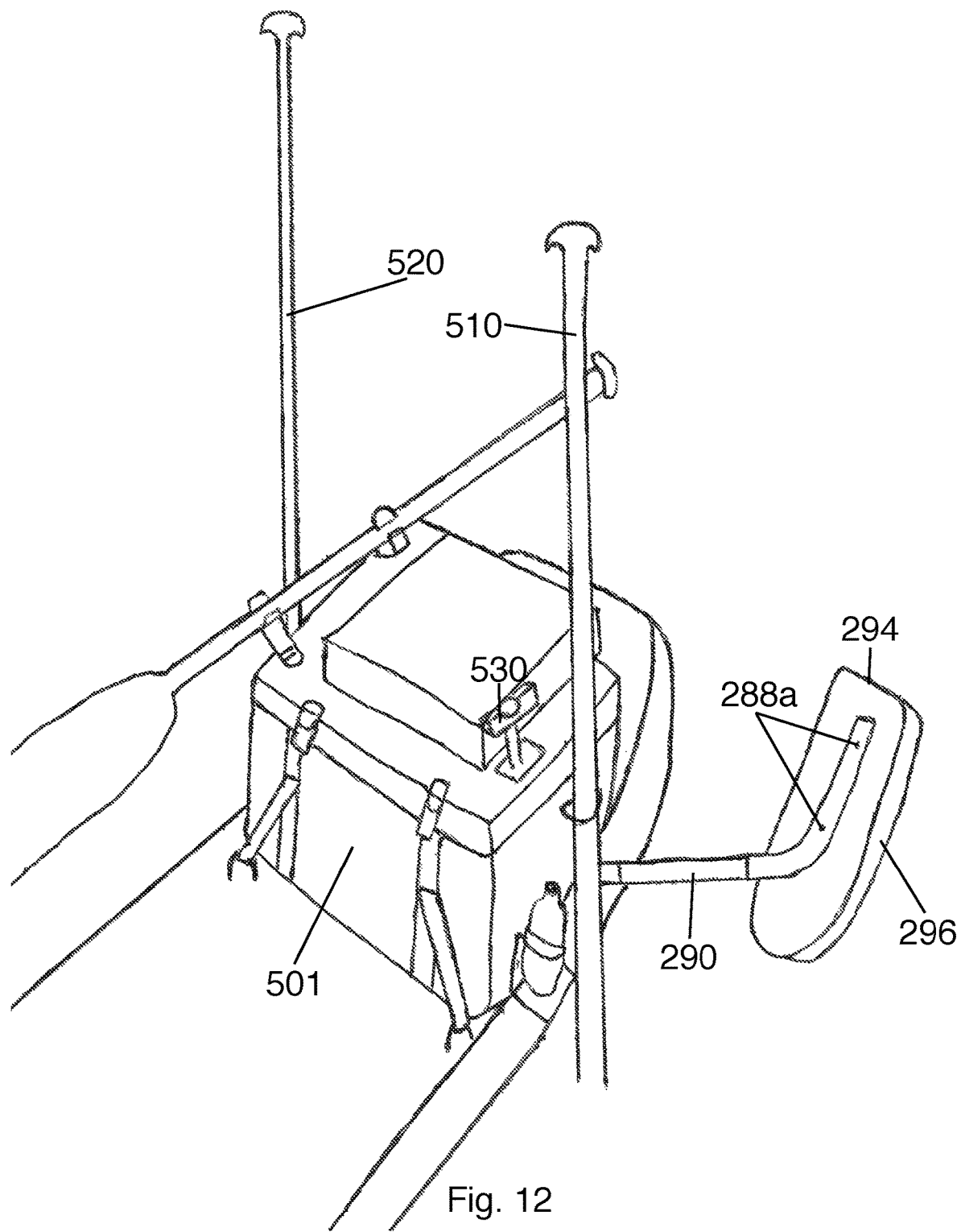
FIG. 12 is a side perspective view of a fishing conversion kit attached to a SUP.

In one example, the pontoon support frame includes a snap button that reduces the total width of the pontoon assembly, providing less stabilization on the innermost setting and more stabilization on the outermost setting. FIG. 12 shows various adjustment positions for attaching the frame to the pontoons so that the pontoons can slide closer or farther away from the seat unit.

Methods of Assembly and Use

Figure 8:
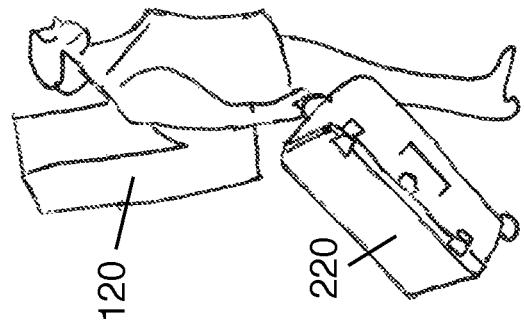
FIG. 8 shows an example inflatable SUP in a carry case and a rolling storage case.

FIG. 8 shows an example inflatable SUP in a stand up paddleboard backpack 120 and a rolling storage case 220. The ScubaSUP and inflatable SUP are easy to travel with and store.

Figure 9:
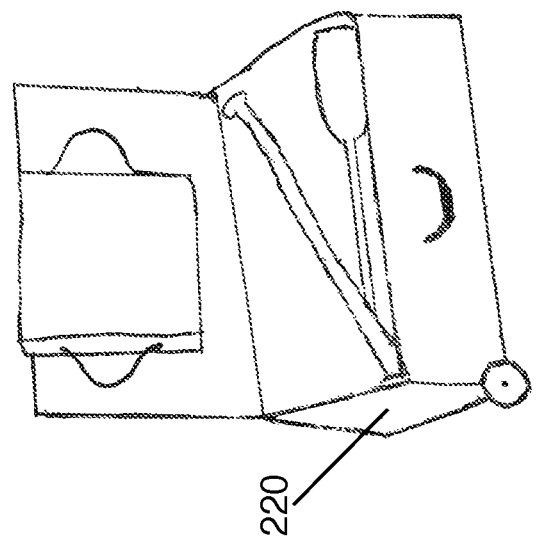
FIG. 9 shows an open rolling storage case with dive gear, pontoons, paddle assembly and PFD.

FIG. 9 shows an open rolling storage case 220 with dive gear, pontoons, paddle assembly and PFD 230.

The storage case is rolled to the beach or dock and opened. The pontoon assemblies and paddle assemblies are assembled. The storage case and pontoon assemblies are attached to the SUP. The diver paddles to the dive site and opens the case to retrieve any other gear.

The storage case may be configured to hold flippers, dive camera gear, mask, spear gun, fish, tackle box, lunch, beverages, fishing gear, hunting gear, dry storage for ammo box, game storage, camping gear, keys, cell phone, first aid kit, dry clothes, etc. In other examples, the conversion kit may be used for search and rescue and recovery work, allowing EMT gear and medical supplies to remain dry.

Example—Single Diver

In this example, the storage case is 26"×20"×12", and has a weight of about 28 pounds. An example diving kit includes a tank cradle, two adjustable width pontoons, storage seat, dive flag and holder, paddle holder, beverage holder, tie-downs and PFD seat cushion. In some examples, the pontoons may be 4" tall, or 6" tall pontoons to accommodate SUPs of different thicknesses.

In other examples, all or part of the storage case may serve as an ice chest.

Example—Second Diver

In this example, the conversion kit includes the single diver equipment, and a second cradle tank holder, kayak paddle and kayak seat.

Figure 10:
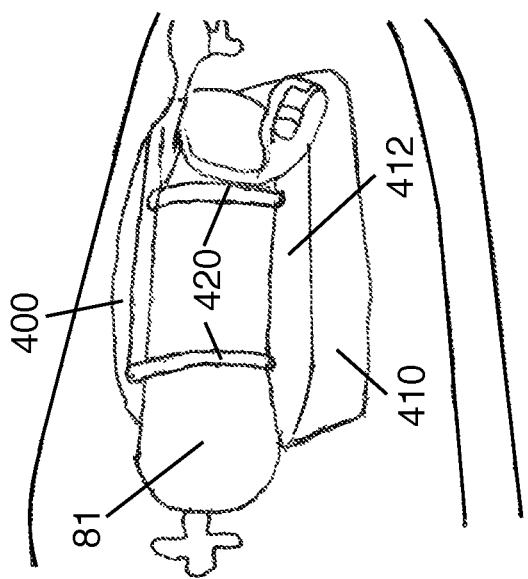
FIG. 10 shows a tank cradle with a base and a concave tank support for holding a second Scuba tank.

FIG. 10 shows a tank cradle 400 with a base 410 and a concave tank support 412 and hold down cords 420. The tank cradle may be attached to SUP to hold a second Scuba tank as the user or users paddle to your the dive site. A larger storage case is configured to hold the tank cradle.

Figure 11:
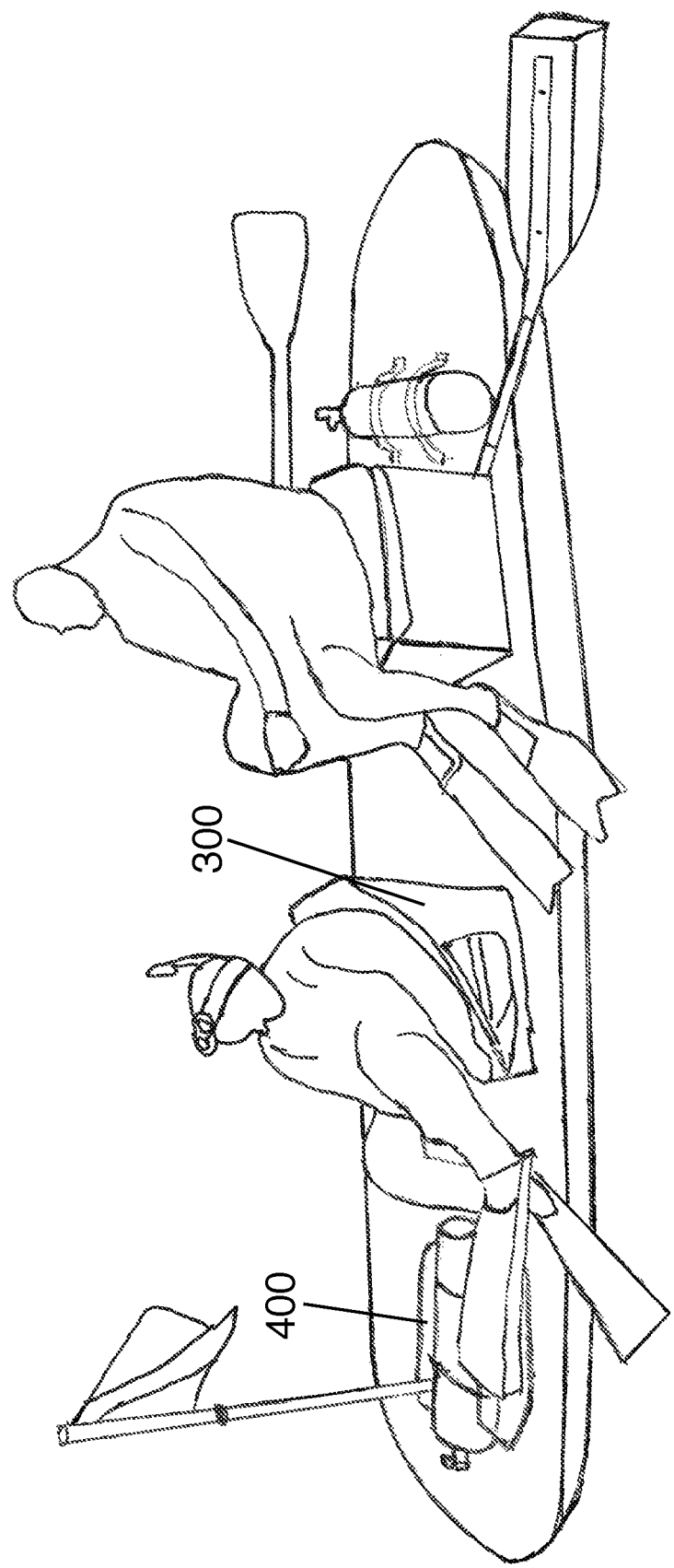
FIG. 11 shows a second diver in a kayak seat with a second Scuba tank supported in the cradle tank holder.

FIG. 11 shows a second diver in a kayak seat 300 with a second Scuba tank 81 supported in the cradle tank holder 400.

Description of Embodiment—Stabilization and Utility Kit for Adapting SUP for Fishing FIG. 12 is a side perspective view of a fishing conversion kit 501 attached to a SUP In this example, the fishing conversion kit includes a rod holder 530 and stakeout poles 510, 520 for shallow water or bay fishing, a net holder, and a lure holder/tool box.

FIG. 12 shows left pontoon frame assembly 290 with distal portion 294 of the frame attached the center of pontoon 296. In this example, The pontoon includes adjustment slots 298*a* and 298*b* so that the frame may be attached in the slots in order to position the pontoon closer to the seat or farther from the seat according to the users' desired SUP stability.

Figure 13:
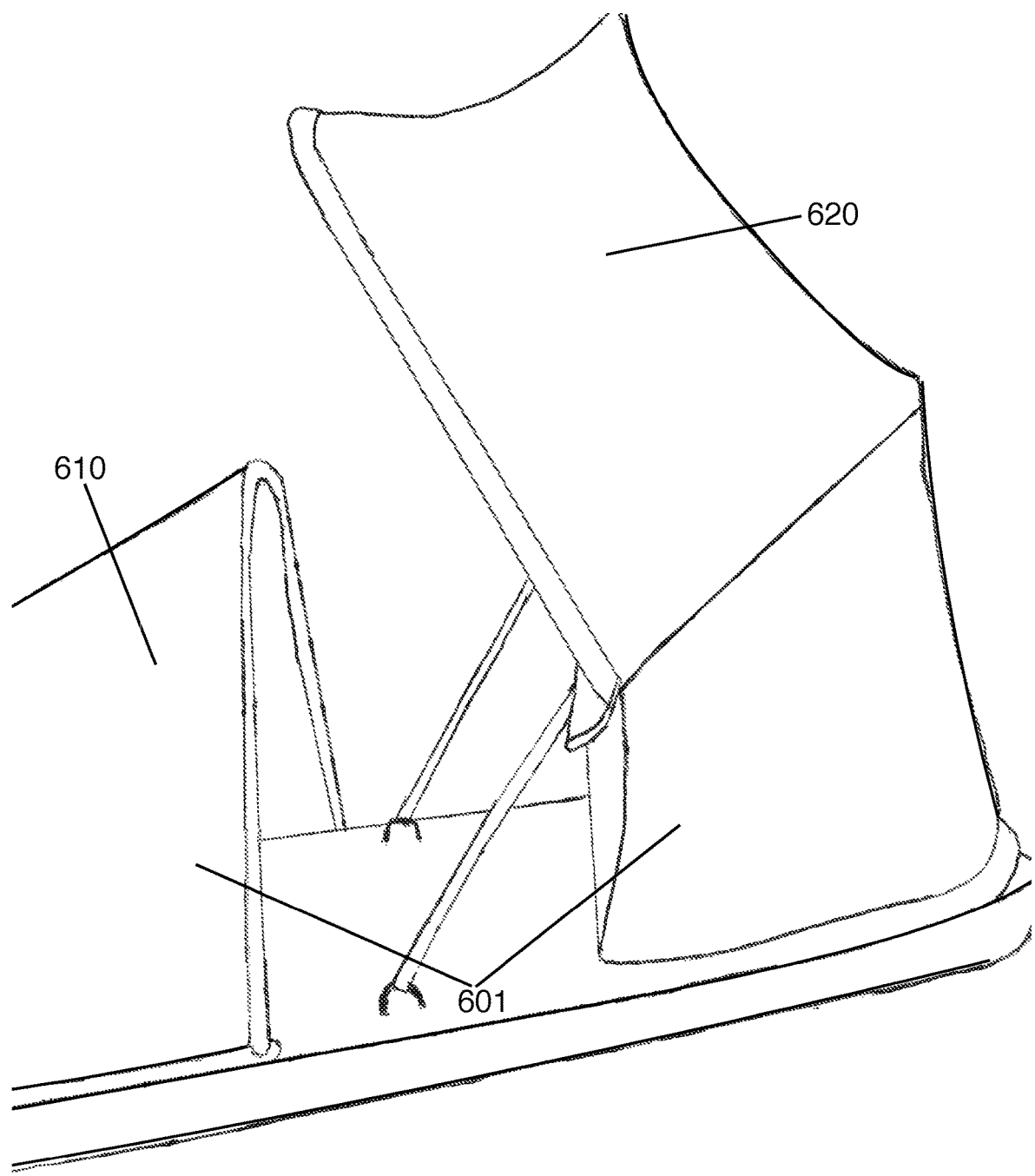
FIG. 13 is a side view of a hunting conversion kit installed on a SUP.
Figure 18:
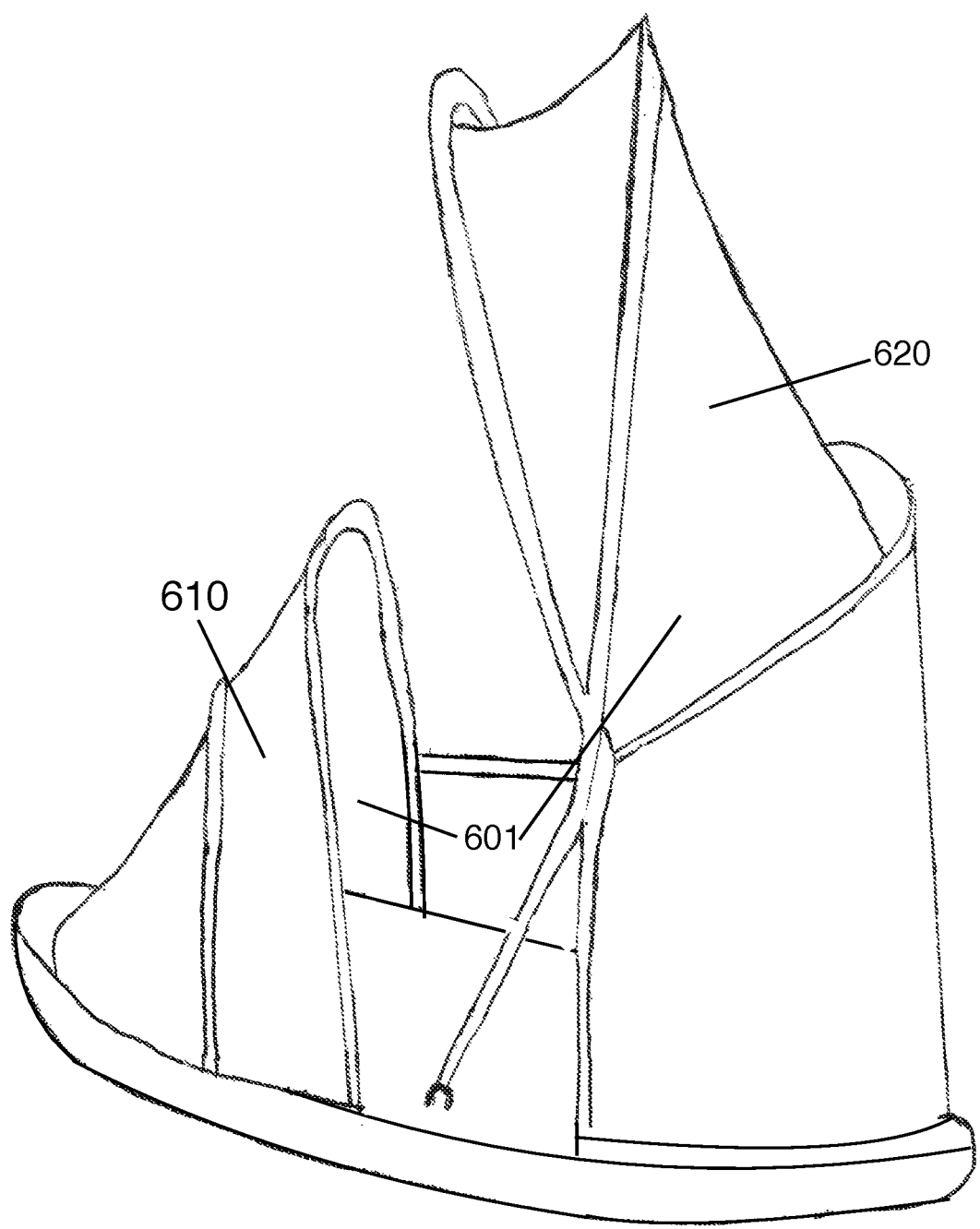
FIG. 18 is a side view of a second example hunting conversion kit installed on a SUP

Description of Embodiment—Stabilization and Utility Kit for Adapting for Hunting FIG. 13 is a side view of a hunting conversion kit 601 installed on a SUP. In this example, a front frame is assembled to support a front canopy 610, and a rear frame is assembled to support a retractable rear canopy 620. FIG. 18 is a side view of a second example hunting conversion kit 601 installed on a SUP. In this example, a front frame is assembled to support a front camouflaged canopy 610, and a rear frame is assembled to support a retractable rear camouflaged canopy 620.

Figure 14:
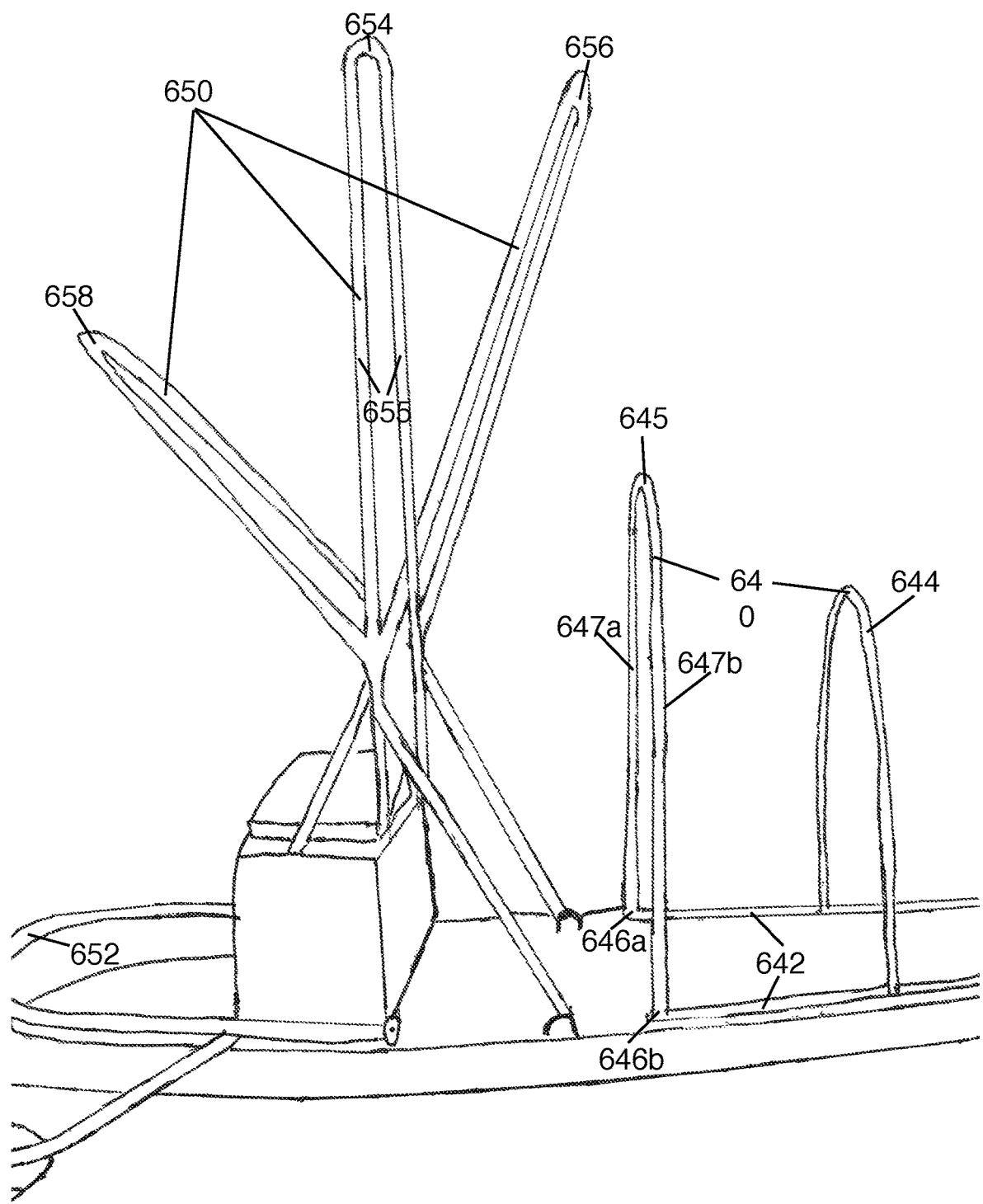
FIG. 14 is a side view of an example front canopy frame and retractable rear canopy frame of the conversion kit of FIG. 13.

FIG. 14 is a side view of an example front canopy frame 640 and retractable rear canopy frame 650. In this example, the front canopy frame comprises a base frame assembly 642, a rear vertical assembly 645 and a middle support 644. The rear vertical assembly 645 is formed by assembling elbow sections 646*a* and 646*b*, and vertical sections 647*a* and 647*b*. The middle support 644 is formed by bending a flexible rod and inserting each end into holes in the base frame.

The retractable rear frame assembly 650 includes a base assembly 652, a vertical assembly 654, forward angled frame assembly 656, and rearward angled frame assembly 658.

Figure 15:
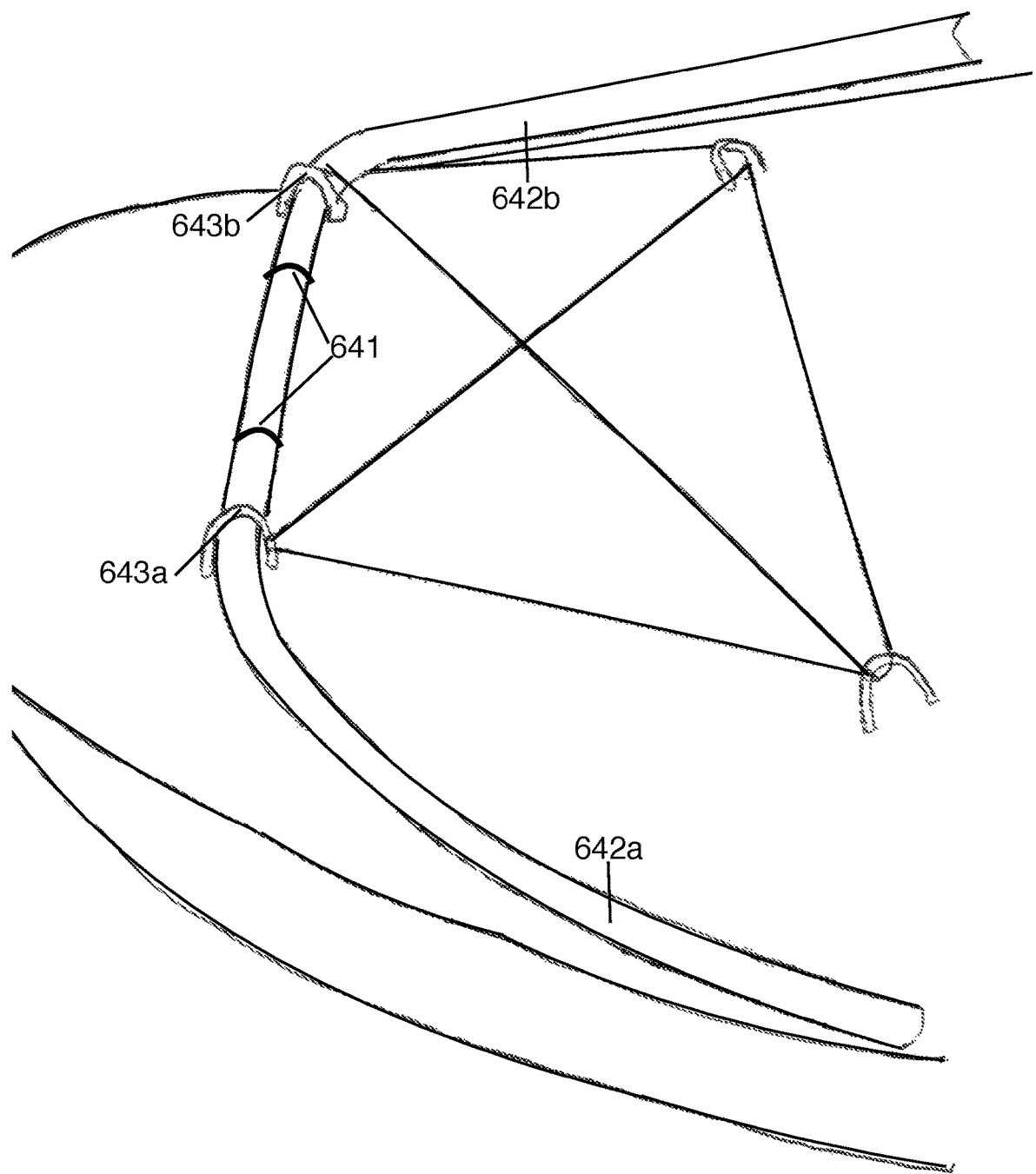
FIG. 15 is a detailed top perspective view of the front portion of the front canopy frame of the conversion kit of FIG. 13.

FIG. 15 is a detailed top perspective view of the front portion of the front canopy frame. As shown in FIG. 15, the front canopy frame is quickly assembled by sliding the end of the front canopy base left side frame 642*a* under retaining ring 643*a*; sliding the end of the front canopy base right side frame 642b under retaining ring 643b; and connecting the ends at joint 641. In this example, the front canopy framing is formed from electrical conduit, and the joint is formed by inserting to right side base frame end into the enlarged coupling end of the base left side frame.

Figure 16:
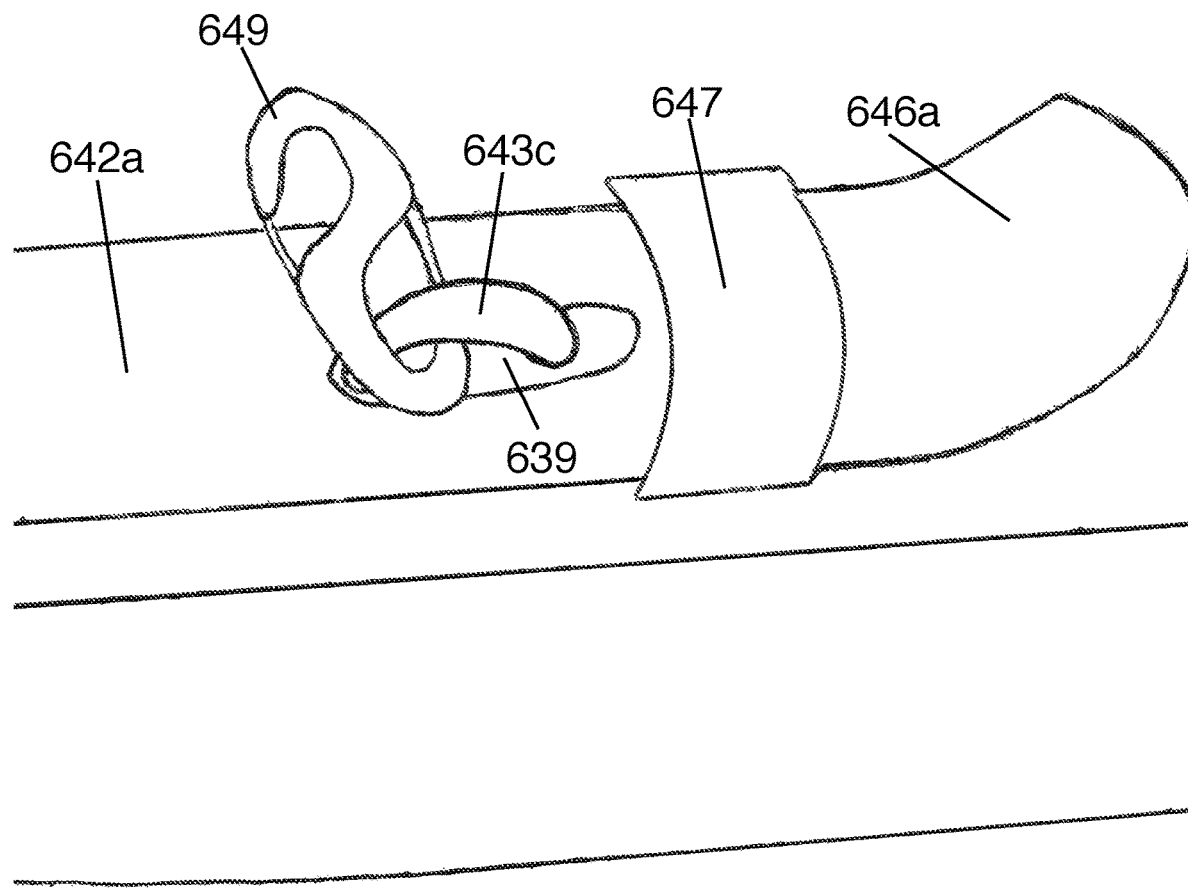
FIG. 16 is a side view detailed view of the front canopy frame of the conversion kit of FIG. 13.

FIG. 16 is a side view detailed view of the front canopy frame of the conversion kit of FIG. 13. The front canopy base left side frame 642a is attached to front canopy rear vertical support elbow 646a and vertical section. In this example, a slot 639 is provided in the front canopy base left side frame, and the slot is positioned over retaining ring 643c and secured by clip 649.

Figure 17:
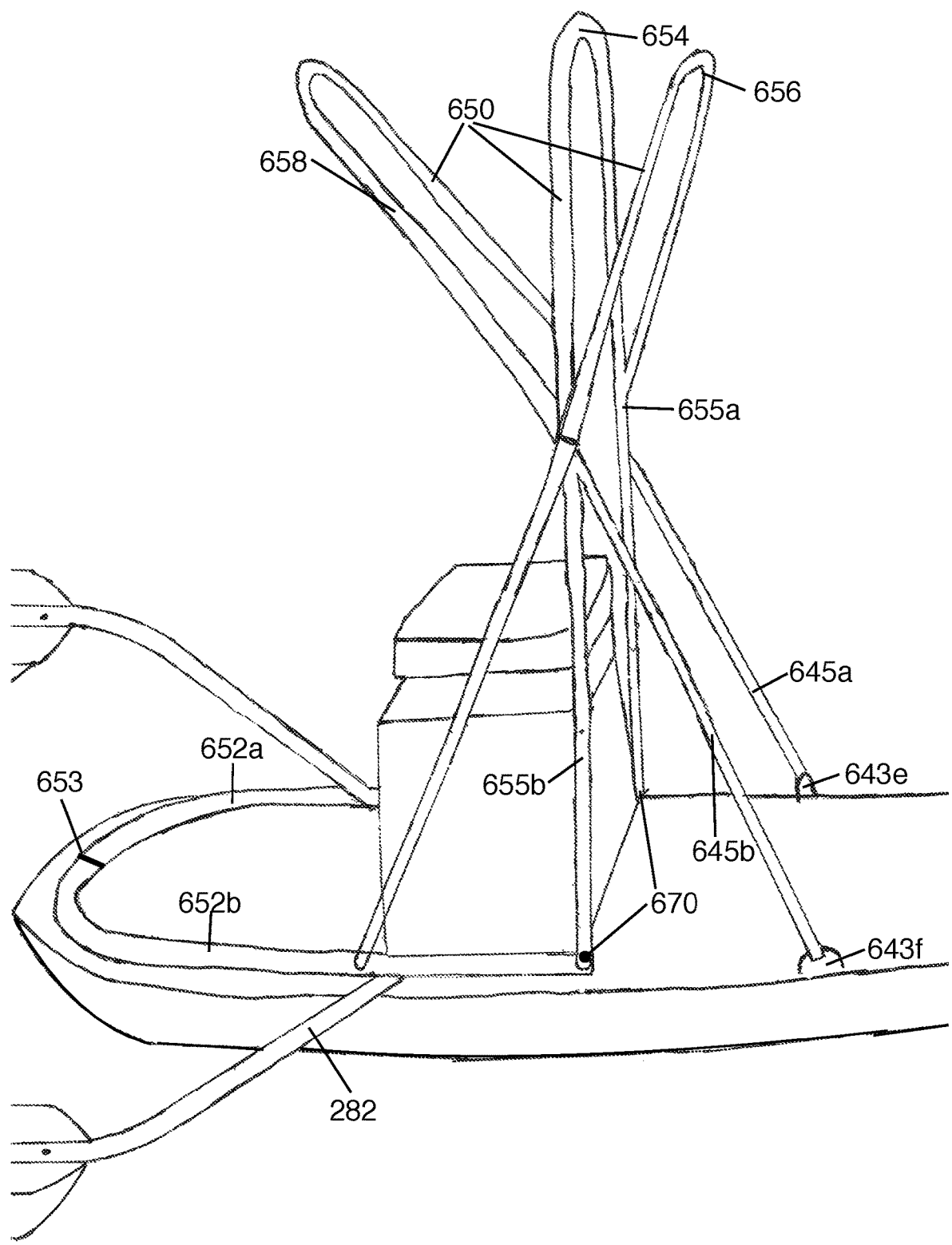
FIG. 17 is a detailed side view of the rear canopy frame assembly of the conversion kit of FIG. 13.

FIG. 17 is a detailed side view of the rear canopy frame assembly 650. In this example, the base frame assembly includes a right side 652b, and left side 652a, which are connected at joint 653. In this example, the base frame is wider than some portions of the SUP and is supported by proximal portions 282 of the pontoon frame assemblies.

The vertical frame assembly 654 is assembled from sections, including vertical supports 655a and 655b which are connected to pivotal vertical support elements 670. The pivotal vertical support elements are attached to the container. The vertical frame assembly 654 is braced by straps 645a and 645b which are secured by rings 643e and 643f; and by straps 645c (not shown) and 645d which are secured directly to the SUP or to the container.

In one example, the hunting conversion kit includes a shotgun holder and a rear retractable blind that folds back to allow the occupant a free range of motion and more standing height when attached. A second blind can be attached to the front of the SUP to hide a hunting dog or to store decoys. In other examples, the conversion kit may be adapted to photography or bird watching.

It is to be understood that the specific embodiments and examples described above are by way of illustration, and not limitation. Various modifications may be made by one of ordinary skill, and the scope of the invention is as defined in the appended claims.

What is claimed is:

1. A conversion kit for a stand up paddleboard ("SUP") having a front end, a rear end, a right side, and a left side, and a plurality of tie-down elements, a middle portion and a rear quarter portion, the conversion kit comprising
    a storage container comprising
        a storage container bottom,
        a storage container top, such that the top is spaced apart from the bottom,
        an SUP attachment element configured to attach the storage container to the middle or rear quarter portion of a SUP, so that the storage container functions as a seat;
    a right side pontoon assembly comprising
        a right pontoon, and
        a right side frame having
            a lateral frame element affixed to the storage container,
            a pontoon fame segment attachable to the right pontoon, and
            a diagonal frame segment between the lateral frame element and the pontoon fame segment, such diagonal frame segment is angled rearward of the storage container,
            such that the right pontoon is positioned rearward of the storage container when the storage container is attached to the SUP; and
    a left side pontoon assembly comprising
        a left pontoon, and
        a left side frame having
            a lateral frame element affixed to the storage container,
            a pontoon fame segment attachable to the left pontoon, and
            a distal portion attachable to the left pontoon, and
            a diagonal frame segment between the lateral frame element and the pontoon fame segment, such diagonal frame segment is angled rearward of the storage container,
            such that the left pontoon is positioned rearward of the storage container when the storage container is attached to the SUP.

2. The conversion kit of claim 1 wherein
    the storage container is attachable onto a rear portion of the SUP; and
    the right pontoon and the left pontoon are positioned outward from the rear quarter portion of the SUP.

3. The conversion kit of claim 1 wherein
    the right pontoon provides a plurality of right side adjustment slots, such that the the plurality of right side adjustment slots are configured to permit attachment of the right side frame pontoon frame section to position the right pontoon at variable distances from the right side of the SUP.

4. The conversion kit of claim 1 wherein
    the right pontoon and left pontoon have longitudinal midlines; and
    the right pontoon and left pontoon have a plurality of adjustment slots that permit the distal portions of the right and left side frame pontoon frame sections to be attached at different positions relative to the longitudinal midline of the pontoons.

5. The conversion kit of claim 1 further comprising a paddle holder.

6. The conversion kit of claim 1 further comprising aPFD cushion.

7. The scuba kit of claim 1 further comprising a kayak seat attachable to the SUP.

8. The conversion kit of claim 1 of claim 1 wherein
    the storage case has a rectangular cross section, and has a length of about 26 inches, a width of about 20 inches, and a height of about 12 inches.

9. The conversion kit of claim 1 wherein
    the top portion of the storage case is hinged.

10. The conversion kit of claim 1 wherein
    the conversion kit is self-contained and requires no tools for assembly.

11. The conversion kit of claim 1 wherein
    the storage container is a waterproof box or ice chest.

12. The conversion kit of claim 1 wherein the conversion kit further comprises a plurality of scuba tank tie down straps.

13. The conversion kit of claim 1 wherein the storage container further comprises a SCUBA flag holder;
    a SCUBA flag;
    a drink holder; and
    a plurality of scuba tank tie down straps.

14. The conversion kit of of claim 1
    further comprising a scuba tank cradle attachable to the SUP.

15. The conversion kit of claim 1 further comprising a fishing rod holder or a net holder.

16. The conversion kit of claim 1 further comprising a fishing rod holder, and
    a pair of stakeout poles.

17. The conversion kit of claim 1 further comprising a canopy frame;
 a retractable blind covering the rear end portion of the SUP; a front canopy configured to conceal a dog or decoys; and
 a shotgun holder.

18. A method of stabilizing a SUP the method comprising attaching a storage container onto a rear portion of a SUP; attaching a lateral frame element to the storage container; providing a right side pontoon assembly comprising
 a right pontoon, and
 a right side frame having
  a pontoon frame segment attachable to the right pontoon, and
  a diagonal frame segment;
 providing a left side pontoon assembly comprising
 a left pontoon, and
 a left side frame having
  a pontoon frame segment attachable to the right pontoon, and
  a diagonal frame segment;
 assembling the right side and left side pontoon assemblies; and
 attaching the right side and left side pontoon assemblies to the lateral frame element, such right side and left side diagonal frame segments are angled rearward of the storage container.

19. The method of claim 18 further comprising
 adjusting the distance of the right side pontoon from the SUP by selecting points of attachment of the right side pontoon to the right side pontoon frame segment.

\* \* \* \* \*